US012705395B2

(12) United States Patent
Balayan et al.

(10) Patent No.: US 12,705,395 B2
(45) Date of Patent: Aug. 11, 2026

(54) SYSTEMS AND METHODS FOR APPLYING DATA ANONYMIZATION SCHEMES BASED ON VERSIONS OF A SOFTWARE

(71) Applicant: Acronis International GmbH, Schaffhausen (CH)

(72) Inventors: Mikhail Balayan, Singapore (SG); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 21 days.

(21) Appl. No.: 18/889,493

(22) Filed: Sep. 19, 2024

(65) Prior Publication Data

US 2025/0103750 A1 Mar. 27, 2025

Related U.S. Application Data

(60) Provisional application No. 63/540,702, filed on Sep. 27, 2023.

(51) Int. Cl.
*G06F 21/62* (2013.01)
*G06F 8/71* (2018.01)

(52) U.S. Cl.
CPC ............ *G06F 21/6254* (2013.01); *G06F 8/71* (2013.01)

(58) Field of Classification Search
None
See application file for complete search history.

(56) References Cited

U.S. PATENT DOCUMENTS

2006/0190579 A1* 8/2006 Rachniowski ...... H04L 41/0866 709/223
2008/0301175 A1* 12/2008 Applebaum ...... G06F 16/24565 707/999.102
2010/0049743 A1* 2/2010 Schmidt ............. G06F 11/2294 715/810
2017/0237628 A1* 8/2017 Purdy ................. H04L 41/0843 709/223
2017/0337227 A1* 11/2017 Abraham ............ G06F 16/2264
2020/0117831 A1* 4/2020 Eckhard ................ H04L 9/0643
2021/0042657 A1* 2/2021 Tiruveedhula ....... G06N 3/0895
2021/0263900 A1* 8/2021 Joyce ..................... G06N 20/00

* cited by examiner

*Primary Examiner* — Scott B Christensen
(74) *Attorney, Agent, or Firm* — ArentFox Schiff LLP; Michael Fainberg

(57) ABSTRACT

A system may store user data associated with a usage of a software application. A system may receive a request for the user data from a developer of the software application. A system may determine whether the user data is generated from a first version of the software application or a second version of the software application. A system may in response to determining that the user data is generated from the first version of the software application, retrieving a first dictionary that indicates an anonymization scheme for transmitting the user data of the first version of the software application, wherein each version of the software application has a different dictionary. A system may execute the anonymization scheme on the user data to generate anonymized user data. A system may transmit the anonymized user data to the developer in response to the request.

17 Claims, 3 Drawing Sheets

SYSTEMS AND METHODS FOR APPLYING DATA ANONYMIZATION SCHEMES BASED ON VERSIONS OF A SOFTWARE

CROSS-REFERENCE TO RELATED APPLICATIONS

This application claims the benefit of U.S. Provisional Application No. 63/540,702, filed Sep. 27, 2023, which is herein incorporated by reference.

FIELD OF TECHNOLOGY

The present disclosure relates to the field of data security, and, more specifically, to systems and methods for applying data anonymization schemes based on versions of a software.

BACKGROUND

Any organization that stores and processes user data faces a situation where the organization needs to transfer the user data to developers and testers within the organization in order to enhance its data processing tools. The organization may even transfer the user data to a third-party company if the product development is outsourced. The more complex the storage structures and the more diverse the queries to this user data, the higher the probability of performance issues arising. Moreover, the more similar the data is to production data in terms of composition and distribution, the greater the likelihood that a developer or tester will identify product issues in the internal environment, allowing them to address these issues before they affect the organization's clients.

Alternatively, by using the same data, they can reproduce problems that have already occurred with clients and therefore be able to eliminate them. However, a problem exists in that the user data may include sensitive or personal information about users, such as names, addresses, contact details, financial information, or other identifiable data, and the extraction of this data from the production environment carries the risk of data leakage. This is where data anonymization mechanisms can help; however ensuring that the applied mechanism always corresponds to the version of the product being used is non-trivial, and a situation may arise where not all fields containing sensitive data undergo anonymization-thus retaining the risk of data leaks.

SUMMARY

In one exemplary aspect, the techniques described herein relate to a method for anonymizing user data, the method including: storing user data associated with a usage of a software application; receiving a request for the user data from a developer of the software application; determining whether the user data is generated from a first version of the software application or a second version of the software application; in response to determining that the user data is generated from the first version of the software application, retrieving a first dictionary that indicates an anonymization scheme for transmitting the user data of the first version of the software application, wherein each version of the software application has a different dictionary; executing the anonymization scheme on the user data to generate anonymized user data; and transmitting the anonymized user data to the developer in response to the request.

In some aspects, the techniques described herein relate to a method, further including: in response to determining that the user data is generated from the second version of the software application, retrieving a second dictionary that indicates a different anonymization scheme for transmitting the user data of the second version of the software application; executing the different anonymization scheme on the user data to generate different anonymized user data; and transmitting the different anonymized user data to the developer in response to the request.

In some aspects, the techniques described herein relate to a method, wherein the user data includes: clickstream data, user settings in the software application, and personal information.

In some aspects, the techniques described herein relate to a method, further including: prior to storing the user data, receiving the first version of the software application and the first dictionary from the developer.

In some aspects, the techniques described herein relate to a method, further including verifying the first dictionary by: constructing, using a database service table, a data model including various tables and fields representing user data expected to be produced by the first version of the software application; verifying that the first dictionary corresponds to the first version of the software application in response to determining that all of the various tables and fields are described in the first dictionary.

In some aspects, the techniques described herein relate to a method, wherein receiving the request for the user data further includes: identifying, in the request, a query for a data point in a data field of the user data; and determining that the data field includes personally identifiable information (PII) of a user.

In some aspects, the techniques described herein relate to a method, wherein the anonymization scheme removes the PII of the user from the user data, and wherein transmitting the anonymized user data to the developer includes: transmitting the data point without the PII of the user.

In some aspects, the techniques described herein relate to a method, wherein the first dictionary specifies a structure of the user data and fields within the structure that should be transmitted as is, encrypted, withheld from transmission, or modified before transmission.

In some aspects, the techniques described herein relate to a method, wherein the structure of user data changes based on a version of the software application accessing the user data.

It should be noted that the methods described above may be implemented in a system comprising at least one hardware processor and memory. Alternatively, the methods may be implemented using computer executable instructions of a non-transitory computer readable medium.

In some aspects, the techniques described herein relate to a system for anonymizing user data, the system including: at least one memory; and at least one hardware processor coupled with the at least one memory and configured, individually or in combination, to: store, in the at least one memory, user data associated with a usage of a software application; receive a request for the user data from a developer of the software application; determine whether the user data is generated from a first version of the software application or a second version of the software application; in response to determining that the user data is generated from the first version of the software application, retrieve a first dictionary that indicates an anonymization scheme for transmitting the user data of the first version of the software application, wherein each version of the software application has a different dictionary; execute the anonymization scheme on the user data to generate anonymized user data; and transmit the anonymized user data to the developer in response to the request.

In some aspects, the techniques described herein relate to a non-transitory computer readable medium storing thereon computer executable instructions for anonymizing user data, including instructions for: storing user data associated with a usage of a software application; receiving a request for the user data from a developer of the software application; determining whether the user data is generated from a first version of the software application or a second version of the software application; in response to determining that the user data is generated from the first version of the software application, retrieving a first dictionary that indicates an anonymization scheme for transmitting the user data of the first version of the software application, wherein each version of the software application has a different dictionary; executing the anonymization scheme on the user data to generate anonymized user data; and transmitting the anonymized user data to the developer in response to the request.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for applying data anonymization schemes based on versions of a software. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

To address the shortcomings of universal anonymization schemes, the present disclosure describes generating data anonymization dictionaries that are tailored to specific application/service/product versions. Once an anonymization dictionary is developed, a validation process is initiated to ensure its alignment with the application/service/product version. This verification is carried out using database service tables, which serve as the foundation for constructing a data model. This model is then compared against the dictionary. The validation is considered successful when all tables and fields are described in the dictionary; otherwise, if any disparities exist, the validation is deemed unsuccessful.

In an exemplary aspect, anonymized data is exported at once from the production database, so that sensitive data never moves out of the server with the production database. In a conventional setup, data is initially extracted from the database as is, then restored on a dedicated database instance, from which personal and sensitive information is subsequently removed or obfuscated using scripts. Afterward, the backup copy taken from the dedicated database is provided to the relevant parties. In the present disclosure, however, the step involving the dedicated database is eliminated because data is extracted from the source database without any data requiring anonymization.

Figure 1:
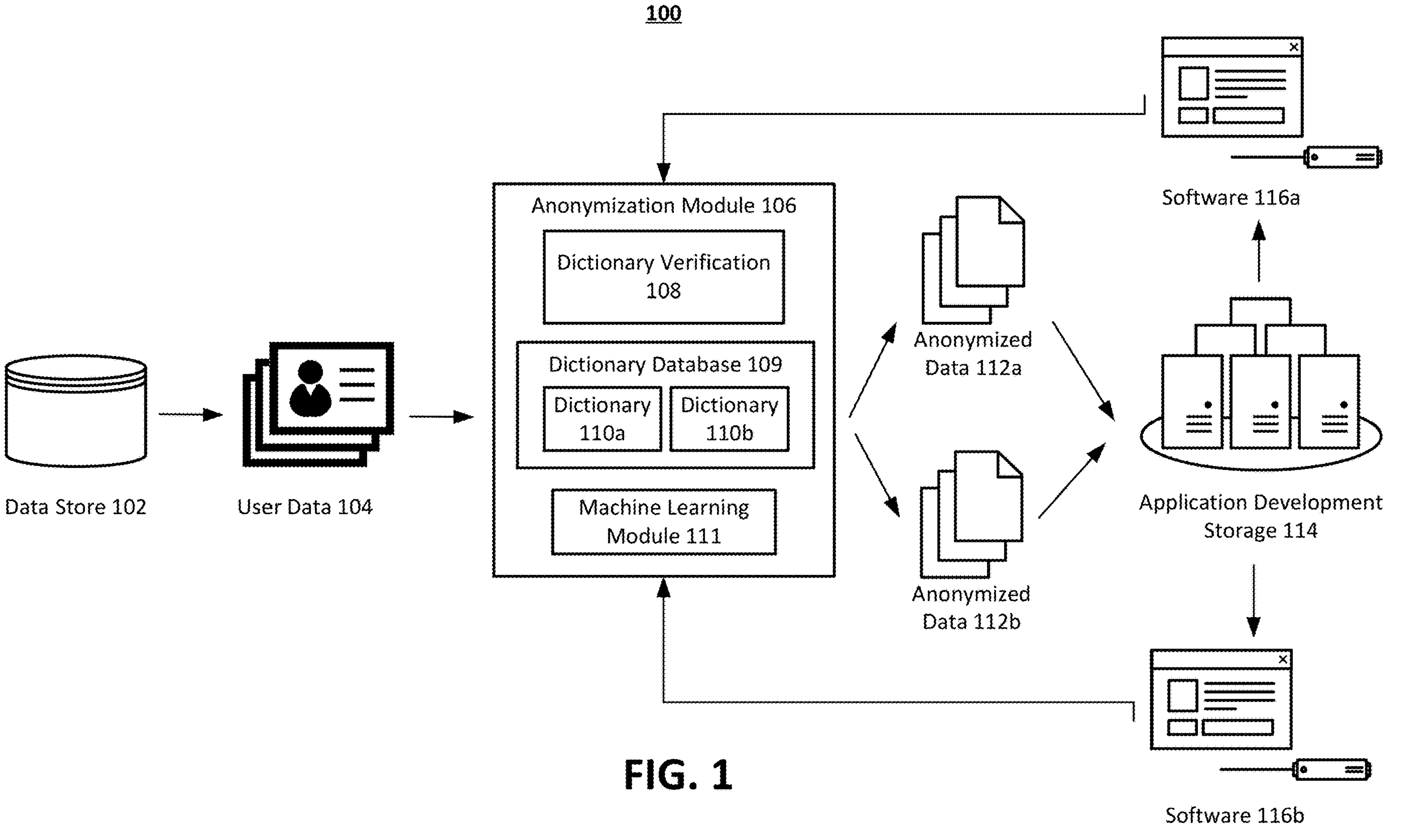
FIG. 1 is a block diagram illustrating a system for applying data anonymization schemes based on versions of a software.

FIG. 1 is a block diagram illustrating system 100 for applying data anonymization schemes based on versions of a software. System 100 includes data store 102, where an organization may collect and store user data 104.

Suppose that an organization is a technology company developing a media streaming platform that enables users to view and interact (e.g., like, comment, etc.) with media (e.g., audio, video, augmented reality media, virtual reality media, video game, etc.). As a given user interacts with the media streaming platform, the organization may collect a click/tap history of the user in order to identify user preferences. For example, the user may search for, comment on, and like videos of cats. Accordingly, the organization may try to entice the user to spend more time on or revisit the media streaming platform by recommending videos of cats. In order to achieve this recommendation capability, user data 104 comprising the click/tap history may be processed by a recommendation engine of the media streaming platform.

Developers of the recommendation engine may improve the software over time. Every version of the recommendation engine may identify a new feature in user data 104 that improves the engine (e.g., in terms of recommendation accuracy, speed, efficient use of processing/memory, etc.). However, in addition to clickstream data, user data 104 may also include user profile information such as name, address, email address, date of birth, billing information, etc., associated with each user. Certain attributes of this data may be sensitive (e.g., credit card information) and unnecessary for producing recommendations.

As mentioned previously, a conventional approach to anonymization of sensitive data involves running a universal anonymization scheme on user data 104. However, based on the version of the software that is utilizing the user data 104, it is possible that certain fields that should be anonymized are left visible for developers when using such universal anonymization schemes.

Consider software 116*a* and software 116*b*, which may be web applications, mobile applications, desktop applications, firmware, software-as-a-service, etc. Both may be different versions of the same software that is developed by the organization. According to the present disclosure, anonymization module 106 is configured to anonymize user data 104 and produce anonymized data 112*a* for software 116*a* and anonymized data 112*b* for software 116*b*. Thus, when application development storage 114, which may be a plurality of servers, stores anonymized data 112*a* and 112*b*, there are no data leaks.

Dictionary verification 108 is a module configured to verify an alignment of the dictionary with the application/service/product version. This verification is carried out using database service tables, which serve as the foundation for constructing a data model. This model is then compared against the dictionary. The validation is considered successful when all tables and fields are described in the dictionary.

Anonymization model 106 is configured to generate data anonymization dictionaries that are tailored to specific applications, services, or product versions. Anonymization model 106 first analyzes the unique requirements and data structures of a particular version of an application. For instance, for a new version of a customer relationship management (CRM) software, anonymization model 106 accounts for any new fields, tables, or data types introduced in the new version compared to a previous version. A dictionary includes mappings of sensitive data fields to anonymized values, ensuring that personal information such as names, addresses, and social security numbers are replaced with non-identifiable equivalents. This initial step is crucial because it ensures that the anonymization process is comprehensive and specific to the version in use, thereby maintaining data privacy and compliance with regulations.

Once an anonymization dictionary is developed, anonymization module 106 initiates a validation process to ensure its alignment with the application, service, or product version. This involves a thorough review and testing phase where the module 106 applies the dictionary to sample data from the specific version. For example, if the module 106 is designed for a healthcare application, it anonymizes sample patient records from the new version using the dictionary. During this validation process, module 106 checks whether all sensitive fields are correctly anonymized and that no personal information is left exposed. This step is essential to confirm that the dictionary works as intended and that it covers all the necessary data fields.

Anonymization module 106 carries out this verification using database service tables, which serve as the foundation for constructing a data model. These tables are essentially the structured storage of data within the application, service, or product, as they include the schema, which includes the tables, fields, and relationships between different data entities. For instance, in an e-commerce platform, database service tables might include customer information, order details, and product inventories. By examining these tables, module 106 constructs a data model that represents how data is organized and interrelated within the system. This model helps with understanding the scope of data that needs to be anonymized and for ensuring that the anonymization dictionary is comprehensive.

The anonymization module 106 then compares this data model against the dictionary. The comparison involves checking each table and field in the data model against the entries in the anonymization dictionary. For example, if the data model includes a table for user accounts with fields for username, email, and password, the dictionary should have corresponding anonymization rules for each of these fields. The comparison process helps the model identify any discrepancies or omissions in the dictionary. If a field in the data model is not covered by the dictionary, it indicates a gap in the anonymization process that needs to be addressed. This step ensures that the dictionary is complete and that all sensitive data fields are accounted for.

The validation is considered successful when all tables and fields are described in the dictionary; otherwise, if any disparities exist, anonymization module 106 deems the validation unsuccessful. A successful validation means that the anonymization dictionary fully covers the data model, and all sensitive information can be anonymized according to the defined rules. If the validation is unsuccessful, it indicates that there are fields or tables in the data model that are not addressed by the dictionary, posing a risk of data exposure. In such cases, module 106 is configured to revise and update the dictionary to include the missing elements. This iterative process of validation and revision ensures that the anonymization dictionary is robust and reliable, providing effective data privacy for the specific application, service, or product version.

It should be noted that product developers can clearly define which data requires anonymization and which fields include sensitive information. Accordingly, they may prepare and maintain anonymization rules for their service data. In an exemplary aspect, a developer of a particular software (e.g., software 116*a*) transmits a custom dictionary (e.g., dictionary 110*a*) that indicates which data is needed for production and which data may be anonymized. Thus, each version of a software has its own version of the dictionary. In response to receiving a dictionary, anonymization module 106 may store the dictionary in a dictionary database 109. In some aspects, dictionary database 109 may include dictionaries of various different schemes. For example, dictionary 110*a* associated with software 116*a* may have a different schema than dictionary 110*b* associated with software 116*b*. Each schema may include the following relations: tables, views and sequences. Relations that are not listed in the dictionary are not exported.

A table is a fundamental component that stores data in rows and columns. It represents a collection of related information. Each row in a table corresponds to a single record, and each column represents a specific attribute or field. Tables are used to organize and store structured data in a relational database.

A view is a virtual table derived from one or more existing tables or views. It does not include actual data; instead, it is a saved query that presents data from other tables in a specific way, often by combining, filtering, or aggregating data. Views can provide a simplified or customized perspective on the data stored in the database without altering the underlying tables.

A sequence is an object that generates a sequence of unique values typically used for generating primary key values. It is especially useful when one needs to create a unique identifier for records in a table. Sequences are often used in situations where the database needs to generate unique values that are not dependent on the actual data being inserted.

The independence of the toolkit and dictionary from the database engine means that the same dictionary can be applied to different database engines used by the service. For example, whether data store 102 is MySQL or PostgreSQL, the service developer will be able to utilize the same dictionary. This allows developers to not worry about the nuances of each database, and simplifies the process of writing dictionaries. In some aspects, the supported engines may include, but are not limited to, MySQL, PostgreSQL, and SQL Server.

Because views and sequences do not contain any user data, anonymization is not applicable to them. In some aspects, sequences may be supported for PostgreSQL (not to be confused with autoincrement fields).

Consider the following example of a dictionary (e.g., dictionary 110*a*):

```
dictionary:
 variables:
 - enc_key
 schemes:
 - name: account-server
  tables:
  - name: ab_migration
  - name: admins
   fields:
    login:
     sql: case when login = “ then ” else HEX(AES_ENCRYPT(login, UNHEX(‘:enc_key’))) end
    totp_key_created:
     sql: totp_key_created
  - name: anonymizer_dictionaries
  - name: authorization_codes
   skip_data: true
  - name: backup_servers
   fields:
    address:
     sql: case when address = “ then ” else CONCAT(‘changed-’, address) end
    internal_address:
     sql: case when internal_address = “ then ” else CONCAT(‘changed-’, internal_address) end
    public_key:
     sql: sha2(public_key, 256)
    root_password: null
    root_user: null
    secret_hash:
     sql: sha2(secret_hash, 256)
  - name: certificateauthorities
   fields:
    certificate: null
    name:
     sql: name
  - name: clients
   fields:
    client_secret:
     sql: SHA2(client_secret, 256)
    client_secret_expires_at:
     sql: client_secret_expires_at
    client_type_name:
     sql: client_type_name
  - name: identities
   fields:
    email:
     sql: case when email = “ then ” else CONCAT(HEX(AES_ENCRYPT(SUBSTRING_INDEX(email,
‘@’, 1), UNHEX(‘:enc_key’))), ‘@’, HEX(AES_ENCRYPT(SUBSTRING_INDEX(email, ‘@’, −1),
UNHEX(‘:enc_key’)))) end
    login:
     sql: case when login is null then null else HEX(AES_ENCRYPT(login, UNHEX(‘:enc_key’)))
end
    password_hash:
     sql: SHA2(password_hash, 256)
  - name: smtp_configs
   fields:
    reply_address:
     sql: case when reply_address = “ then ” else
CONCAT(HEX(AES_ENCRYPT(SUBSTRING_INDEX(reply_address, ‘@’, 1), UNHEX(‘:enc_key’))),
‘@’, HEX(AES_ENCRYPT(SUBSTRING_INDEX(reply_address, ‘@’, −1), UNHEX(‘:enc_key’)))) end
    user: “
    password: “
    server:
     sql: concat(‘changed-’, server)
  - name: user_sessions
   skip: true
```

Breaking down this code, first, dictionary 110*a* announces a user-defined encryption key, named enc_key. According to dictionary 110*a*, anonymization module 106 will export data from the “account-server” schema. In addition, there exists a table “ab_migration” in the schema, which will be exported as well. It should be noted that all exporting functions and encryptions are performed by anonymization module 106.

From table “admins,” field “login” will be exported in encrypted form. The user defined key will be used for encryption. Column “totp_key_created” will be exported as is. Table “anonymizer_dictionaries” will be exported as is. Table “authorization_codes” will be exported, but without data, only schema. This is defined explicitly with “skip_data: true”

From table “backup_servers,” 6 fields will be exported encrypted. Prefix “changed-” will be added to address and internal_address fields. Fields public_key and secret_hash will be exported as SHA2 hash. Fields “root_password” and “root_user” will be exported as empty values. From “certificateauthorities" table, the field "certificate" will be exported as an empty string, while "name" will be exported as is. From "clients," field "client_secret" will be exported as SHA2 hash, while "client_secret_expires_at" and "client_type_name" will be exported as is. From "identities," emails from "email" field will be split into two parts, divided by "@," and each part will be encrypted independently and then merged together.

For example, subroot-admin-akubi8-3@acronis.com will be exported as DD2F30C5D6E246E34B882570F28- E496-60B96C8343490ACC2B14D1056AEF40231@888D29685 084D596861E7FA9A1546702. Field "login" will be encrypted using AES encryption. Field "password_hash" will be exported as SHA2 hash. From "smtp_configs" table, "reply_address" field will be exported the same way as "identities.email" earlier. User and password will be exported as empty strings and "server" will have "changed-" prefix. Lastly, only the definition of the table "user_sessions" will be exported, without data. In some aspects, fields that are not explicitly specified in the dictionary are not exported by anonymization module 106.

There may be a plurality of rules that anonymization module 106 may use to parse user data 104 using a particular dictionary. For example, in terms of tables, if "skip" in a dictionary is set to "true," neither the definition, nor the data is exported for the table. This is considered a rule of the plurality of rules. If "skip_data" is set to true, only the definition is exported for the table. This is another exemplary rule. The "limit" key limits the number of rows to be exported from the table. If "SQL" key is set for a table, data corresponding to the query is exported. In this case, it is important to keep the order of the columns in the query the same as in the table where the easiest way to retrieve column order is to execute select * from tablename.

In some aspects, anonymization rules may be set for each field. For example, anonymization module 106 may specify the fields key which will contain the fields that need any anonymization. If a field is not specified explicitly, related data is exported.

In some aspects, a hardcoded value may be assigned to the field in the form fieldname: value. If a null value is needed, null keywords (e.g., NULL) may be used.

In some aspects, an SQL key is used for the field if some complex logic is needed. Here, SQL functions may be used and one may refer to other table fields.

In some aspects, a variable (e.g., salt, key, etc.) may need to be passed. Anonymization module 106 may thus declare a variable in the variables section, use the variable with a colon as a prefix.

In an exemplary aspect, anonymization module 106 defines the format of a dictionary that will be used by the service owners, developers, etc. Anonymization module 106 further identifies and defines the most frequent anonymization patterns. An anonymization pattern is a set of predefined anonymization rules applied to specific types of data. For instance, a "phone_number_random" rule assumes that a field includes numbers and possibly symbols like +, -, and parentheses. This means that random numbers fitting the phone number pattern will be generated. Similarly, "email_random" implies that random email addresses will be generated with the "@" character.

Anonymization module 106 uses dictionaries and information about the structures and properties of user data 104 within data store 102 to generate queries to export data. Anonymization module 106 further writes a loader that can automatically restore previously exported data. A loader is a component of the anonymization module 106 that creates tables and loads data based on a previously exported data.

In some aspects, an anonymization dictionary may be generated using machine learning. In particular, to create an anonymization dictionary for a new version of a software application, a machine learning module 111 can employ a supervised learning algorithm such as Named Entity Recognition (NER) using deep learning models like Bidirectional Encoder Representations from Transformers (BERT). The process begins with data collection and labeling, where a large and diverse dataset containing various types of data fields from previous versions of the software application is gathered. This dataset may be prelabeled to indicate which fields contain sensitive information, such as names, addresses, and social security numbers. The dataset may also indicate how these fields are supposed to be processed by a dictionary. For example, the dictionary may specify a structure of the user data and fields within the structure that should be transmitted as is when requested, encrypted, withheld from transmission (e.g., redacted), or modified before transmission (e.g., concatenated, replaced with characters such as "*" where a social security number like 123-45-6789 may be presented as *--*789, etc.). It should be noted that the structure of user data changes based on a version of the software application accessing the user data.

In some aspects, the collected data is then preprocessed to convert it into a format suitable for training the machine learning model. The preprocessing may include tokenization, normalization, and handling of any missing or inconsistent entries. In some aspects, the machine learning module 111 fine-tunes a pre-trained BERT model using this preprocessed and labeled data, adjusting the model's weights to minimize the loss function, which measures the difference between predicted and actual labels. Validation and testing on a separate dataset ensures that the model generalizes well to new data and can accurately identify sensitive fields in different contexts.

Once the machine learning model has been trained and validated, it is applied to the new version of the software application. The module scans the database schema and data fields of the new version, identifying which fields contain sensitive information based on the patterns and characteristics it learned during training. For each identified sensitive field, the module suggests appropriate anonymization techniques, such as pseudonymization for names, generalization for age, and data masking for social security numbers. These suggestions are compiled into an anonymization dictionary, mapping each sensitive field to its anonymized equivalent. This ensures that personal information is replaced with non-identifiable data, maintaining data privacy and compliance with regulations.

In some aspects, the machine learning module 111 may also incorporate a feedback loop for continuous improvement. As the module is applied to new versions of the software application, any errors or missed fields are used to retrain the model, making it more robust and accurate over time. This iterative process ensures that each anonymization dictionary remains comprehensive, effectively addressing the evolving data structures and privacy requirements of different software versions. By leveraging a sophisticated machine learning algorithm like BERT, the module makes the process of creating an anonymization dictionary more efficient, accurate, and adaptable, providing consistent data privacy across various iterations of the application.

Figure 2:
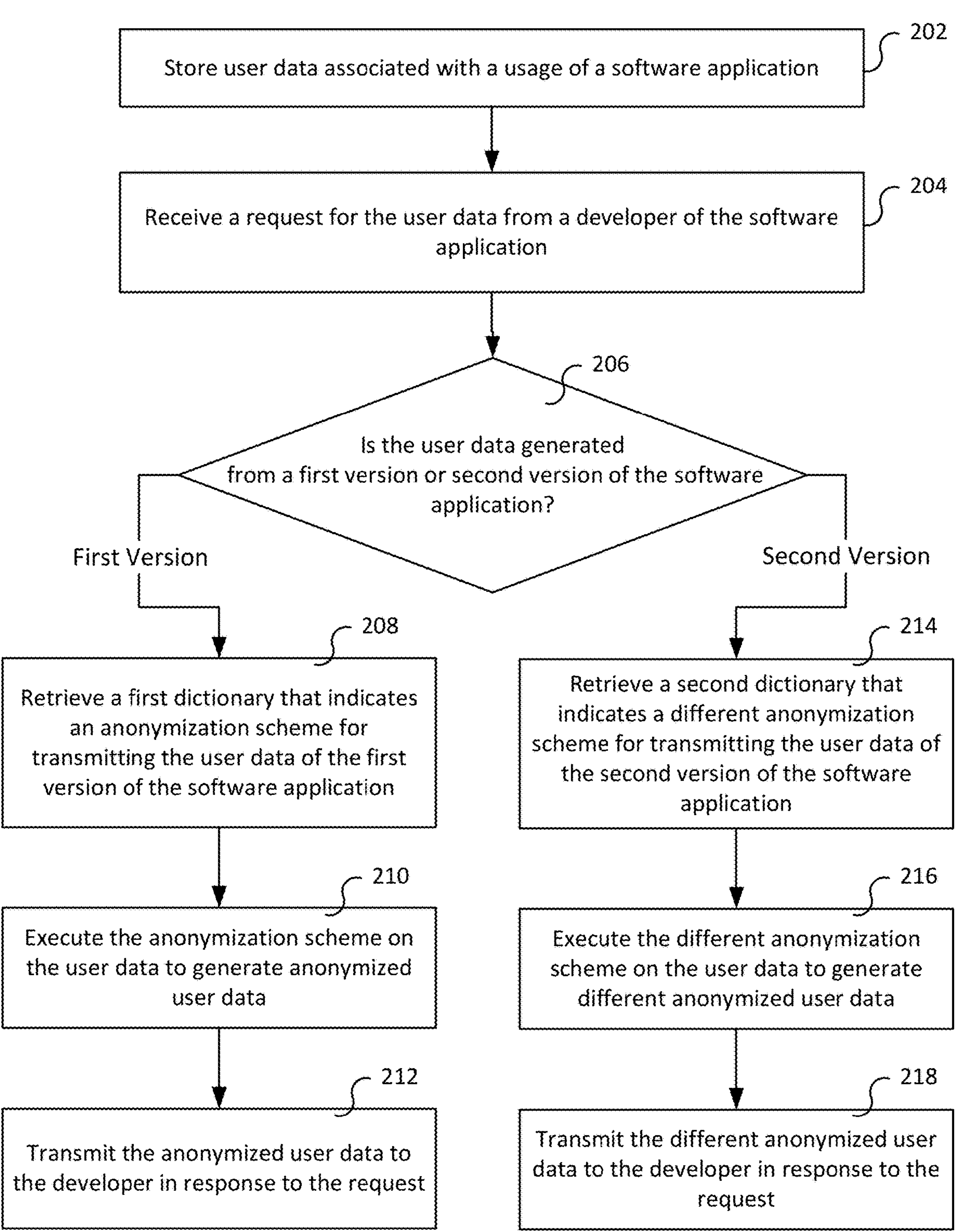
FIG. 2 illustrates a flow diagram of a method for applying data anonymization schemes based on versions of a software.

FIG. 2 illustrates a flow diagram of method 200 for applying data anonymization schemes based on versions of a software. At 202, anonymization module 106 stores (e.g., in memory) user data (e.g., user data 104) associated with a usage of a software application (e.g., one of software 116*a* and 116*b*). In some aspects, the user data comprises: click-stream data, user settings in the software application, and personal information.

At 204, anonymization module 106 receives a request for the user data from a developer the software application. For example, the developer may desire to populate application development storage 114 in order to test and improve the software application.

At 206, anonymization module 106 determines whether the user data is generated from a first version of the software application (e.g., software 116*a*) or a second version of the software application (e.g., software 116*b*). For example, the version of the software may be determined from metadata or installation data of the software application (e.g., a version number).

In response to determining that the user data is generated from the first version of the software application, method 200 advances to 208, where anonymization module 106 retrieves (e.g., from dictionary database 109) a first dictionary (e.g., dictionary 110*a*) that indicates an anonymization scheme for transmitting the user data of the first version of the software application. It should be noted that each version of the software application has a different dictionary.

At 210, anonymization module 106 executes the anonymization scheme on the user data to generate anonymized user data (e.g., anonymized data 112*a*). At 212, anonymization module 106 transmits the anonymized user data to the developer in response to the request.

If at 206, anonymization module 106 determines that the user data is generated from the second version of the software application (e.g., software 116*b*), method 200 advances to 214, where anonymization module 106 retrieves a second dictionary (e.g., dictionary 110*b*) that indicates a different anonymization scheme for transmitting the user data of the second version of the application. At 216, anonymization module 106 executes the different anonymization scheme on the user data to generate different anonymized user data. At 218, anonymization module 106 transmits the different anonymized user data to the developer in response to the request. The reason determining that version of the software application is important is because changes are a natural development of a product. For example, a reporting subsystem of software 116*a* may need a prepared anonymization dictionary 110*a*. The subsystem encompasses report tracking functionality and a corresponding "reports_tracking" table. In the course of development, the subsystem may gain the capability to send notifications about report readiness to an email address, for which a "recipient_email" field may be added to the table in software 116*b* (the latest version). In other words, a situation is encountered where prior to the release of the new functionality in software 116*b*, the "recipient_email" field did not require anonymization. However, after the update, it does, and if this change is not reflected in the dictionary 110*b* of software 116*b*, there is a potential risk of personal data leakage.

In some aspects, prior to storing the user data, anonymization module 106 receives the first version of the software application and the first dictionary from the developer. In some aspects, the dictionary is provided with the service developed by the developer. For example, dictionary 110*a* may be provided with software 116*a* and dictionary 110*b* may be provided with software 116*b*. In some aspects, a dictionary can be stored either as a separate file or within a table, along with the service data (e.g., installation files of software 116*a* or 116*b*).

In some aspects, anonymization module 106 may verify the first dictionary by: constructing, using a database service table, a data model comprising various tables and fields representing user data expected to be produced by the first version of the software application. Anonymization module 106 may verify that the first dictionary corresponds to the first version of the software application in response to determining that all of the various tables and fields are described in the first dictionary. In particular, dictionary verification 108 may review and confirm that all necessary fields are covered by a received dictionary and that the anonymization methods that are being applied are acceptable. When a request from developers for data retrieval is received, the data extraction process is initiated. An anonymized archive is then transmitted to the developer.

In some aspects, when receiving the request for the user data, anonymization module 106 identifies, in the request, a query for a data point in a data field of the user data. Anonymization module 106 then determines that the data field includes personally identifiable information (PII) of a user. In particular, the anonymization scheme is configured to remove the PII of the user from the user data. As a result, when transmitting the anonymized user data to the developer, anonymization module 106 transmits the data point without the PII of the user.

Figure 3:
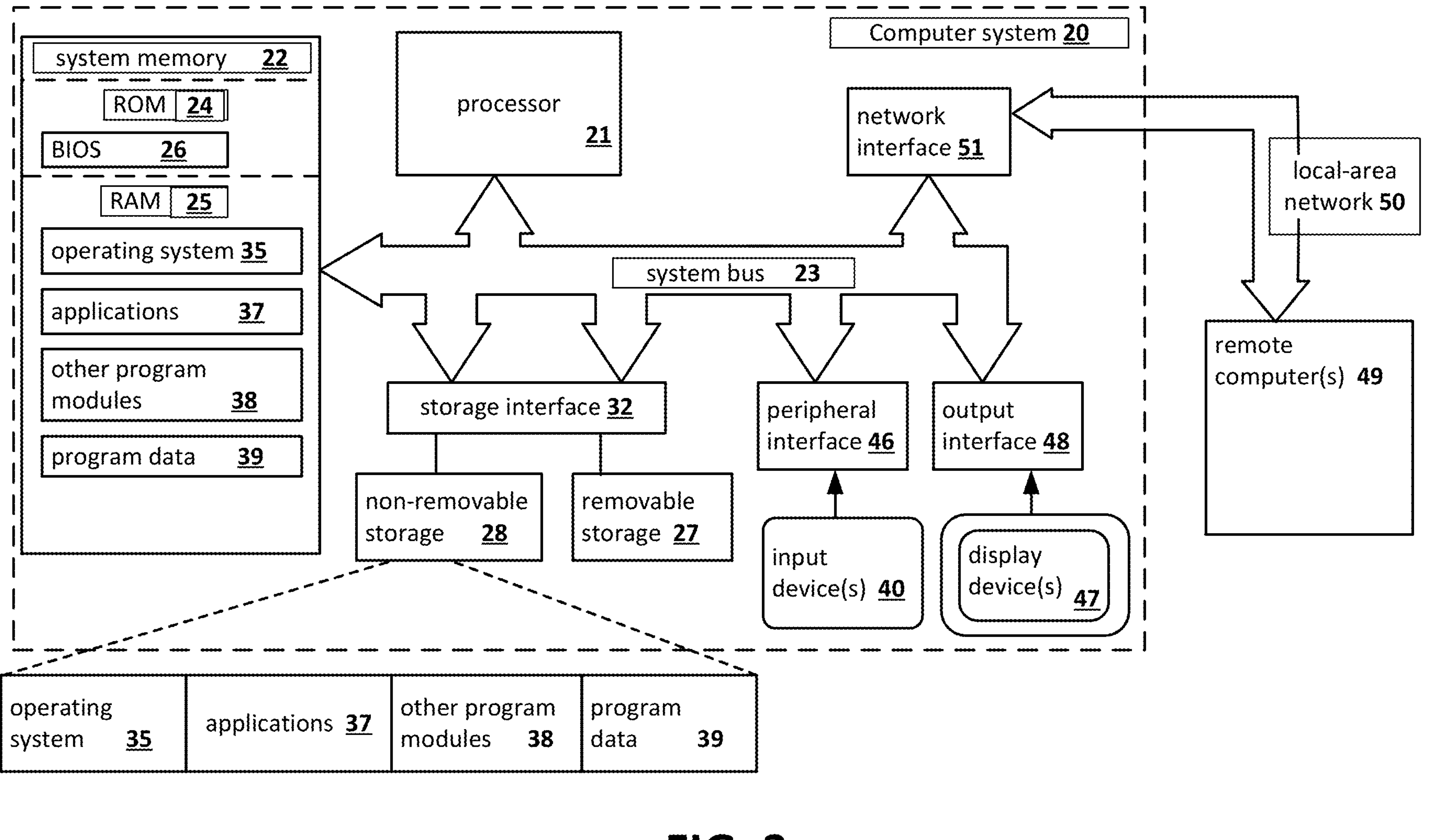
FIG. 3 presents an example of a general-purpose computer system on which aspects of the present disclosure can be implemented.

FIG. 3 is a block diagram illustrating a computer system 20 on which aspects of systems and methods for applying data anonymization schemes based on versions of a software may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for anonymizing user data, the method comprising:

storing user data associated with a usage of a software application;

receiving a request for the user data from a developer of the software application;

determining whether the user data is generated from a first version of the software application or a second version of the software application, wherein the structure of user data changes based on a version of the software application accessing the user data;

in response to determining that the user data is generated from the first version of the software application, retrieving a first dictionary that indicates an anonymization scheme for transmitting the user data of the first version of the software application, wherein each version of the software application has a different dictionary;

executing the anonymization scheme on the user data to generate anonymized user data; and transmitting the anonymized user data to the developer in response to the request.

2. The method of claim 1, further comprising:

in response to determining that the user data is generated from the second version of the software application, retrieving a second dictionary that indicates a different anonymization scheme for transmitting the user data of the second version of the software application;

executing the different anonymization scheme on the user data to generate different anonymized user data; and transmitting the different anonymized user data to the developer in response to the request.

3. The method of claim 1, wherein the user data comprises: clickstream data, user settings in the software application, and personal information.

4. The method of claim 1, further comprising:

prior to storing the user data, receiving the first version of the software application and the first dictionary from the developer.

5. The method of claim 4, further comprising verifying the first dictionary by:

constructing, using a database service table, a data model comprising various tables and fields representing user data expected to be produced by the first version of the software application;

verifying that the first dictionary corresponds to the first version of the software application in response to determining that all of the various tables and fields are described in the first dictionary.

6. The method of claim 1, wherein receiving the request for the user data further comprises:

identifying, in the request, a query for a data point in a data field of the user data; and determining that the data field includes personally identifiable information (PII) of a user.

7. The method of claim 6, wherein the anonymization scheme removes the PII of the user from the user data, and wherein transmitting the anonymized user data to the developer comprises:

transmitting the data point without the PII of the user.

8. The method of claim 1, wherein the first dictionary specifies a structure of the user data and fields within the structure that should be transmitted as is, encrypted, withheld from transmission, or modified before transmission.

9. A system for anonymizing user data, the system comprising:

at least one memory; and at least one hardware processor coupled with the at least one memory and configured, individually or in combination, to:

store, in the at least one memory, user data associated with a usage of a software application;

receive a request for the user data from a developer of the software application;

determine whether the user data is generated from a first version of the software application or a second version of the software application, wherein the structure of user data changes based on a version of the software application accessing the user data;;

in response to determining that the user data is generated from the first version of the software application, retrieve a first dictionary that indicates an anonymization scheme for transmitting the user data of the first version of the software application, wherein each version of the software application has a different dictionary;

execute the anonymization scheme on the user data to generate anonymized user data; and transmit the anonymized user data to the developer in response to the request.

10. The system of claim 9, wherein the at least one hardware processor is further configured to:

in response to determining that the user data is generated from the second version of the software application, retrieve a second dictionary that indicates a different anonymization scheme for transmitting the user data of the second version of the software application;

execute the different anonymization scheme on the user data to generate different anonymized user data; and transmit the different anonymized user data to the developer in response to the request.

11. The system of claim 9, wherein the user data comprises: clickstream data, user settings in the software application, and personal information.

12. The system of claim 9, wherein the at least one hardware processor is further configured to:

prior to storing the user data, receive the first version of the software application and the first dictionary from the developer.

13. The system of claim 12, wherein the at least one hardware processor is further configured to verify the first dictionary by:

constructing, using a database service table, a data model comprising various tables and fields representing user data expected to be produced by the first version of the software application;

verifying that the first dictionary corresponds to the first version of the software application in response to determining that all of the various tables and fields are described in the first dictionary.

14. The system of claim 9, wherein the at least one hardware processor is further configured to:

identify, in the request, a query for a data point in a data field of the user data; and determine that the data field includes personally identifiable information (PII) of a user.

15. The system of claim 14, wherein the anonymization scheme removes the PII of the user from the user data, and wherein the at least one hardware processor is further configured to transmit the anonymized user data to the developer by transmitting the data point without the PII of the user.

16. The system of claim 9, wherein the first dictionary specifies a structure of the user data and fields within the structure that should be transmitted as is, encrypted, withheld from transmission, or modified before transmission.

17. A non-transitory computer readable medium storing thereon computer executable instructions for anonymizing user data, including instructions for:

storing user data associated with a usage of a software application;

receiving a request for the user data from a developer of the software application;

determining whether the user data is generated from a first version of the software application or a second version of the software application, wherein the structure of user data changes based on a version of the software application accessing the user data;

in response to determining that the user data is generated from the first version of the software application, retrieving a first dictionary that indicates an anonymization scheme for transmitting the user data of the first version of the software application, wherein each version of the software application has a different dictionary;

executing the anonymization scheme on the user data to generate anonymized user data; and transmitting the anonymized user data to the developer in response to the request.

* * * * *